United States Patent Office.

GEORGE BURSON, OF EAST PALESTINE, OHIO.

Letters Patent No. 92,578, dated July 13, 1869.

---

IMPROVEMENT IN METHOD OF RETARDING THE GROWTH OF STRAWBERRY-VINES.

---

The Schedule referred to in these Letters Patent and making part of the same.

---

*To all whom it may concern:*

Be it known that I, GEORGE BURSON, of East Palestine, in the county of Columbiana, and in the State of Ohio, have invented a certain new and useful Method for Retarding the Growth of Strawberries, so as to allow of their production out of their season; and do hereby declare that the following is a full, clear, and exact description thereof.

The nature of my invention consists in the herein-described means of suspending vegetation of strawberry-vines for any desired length of time, so as to secure their fruit both earlier and later than would otherwise be possible, or at any time during the growing-season.

To accomplish this object, I make use of three different methods, each having especial advantages for some sections of country, the first of which is as follows:

The plants are carefully packed in boxes, two feet six inches in depth, which are filled with sufficient soil to prevent the roots from being exposed to the air, and at a sufficient distance from the surface of the ground to secure a uniform temperature of from 40° to 42°. This should be done late in the fall or early in the spring, and is, of course, impracticable, except in the vicinity of abandoned mines.

My second method consists in placing the plants in boxes, as above described, in early spring, and packing them in sawdust and ice within an ice-house, but as ice-houses are not always convenient or accessible, this method also possesses some objectionable features, which, however, do not exist in My third method, which can be employed in all sections of the country, except in the extreme southern States. The vines are, as before, packed in boxes in the fall, and after being slightly covered with sawdust, are exposed to the weather until the soil is frozen hard, when the boxes are piled together, covered with from eight to ten inches of sawdust, and exposed until March, when they should be thickly covered with straw. When thus treated, the plants will remain in a frozen condition until late in summer, or until fall. While kept in this condition, vegetation remains suspended, and in order that a continuous supply of strawberries may be had, from their usual seasons until late in the fall, it is only necessary to remove from the boxes a sufficient number of plants each week, which must be placed in the ground and cultivated in the usual manner.

Having thus fully set forth the nature and merits of my invention,

What I claim as new, and desire to secure by Letters Patent, is—

The herein-described treatment of strawberry-plants for the purpose set forth.

In testimony that I claim the foregoing, I have hereunto set my hand, this 7th day of April, 1869.

GEORGE BURSON.

Witnesses:
MAHLON UNDERWOOD,
BENJAMIN BURSON.